Patented Sept. 21, 1943

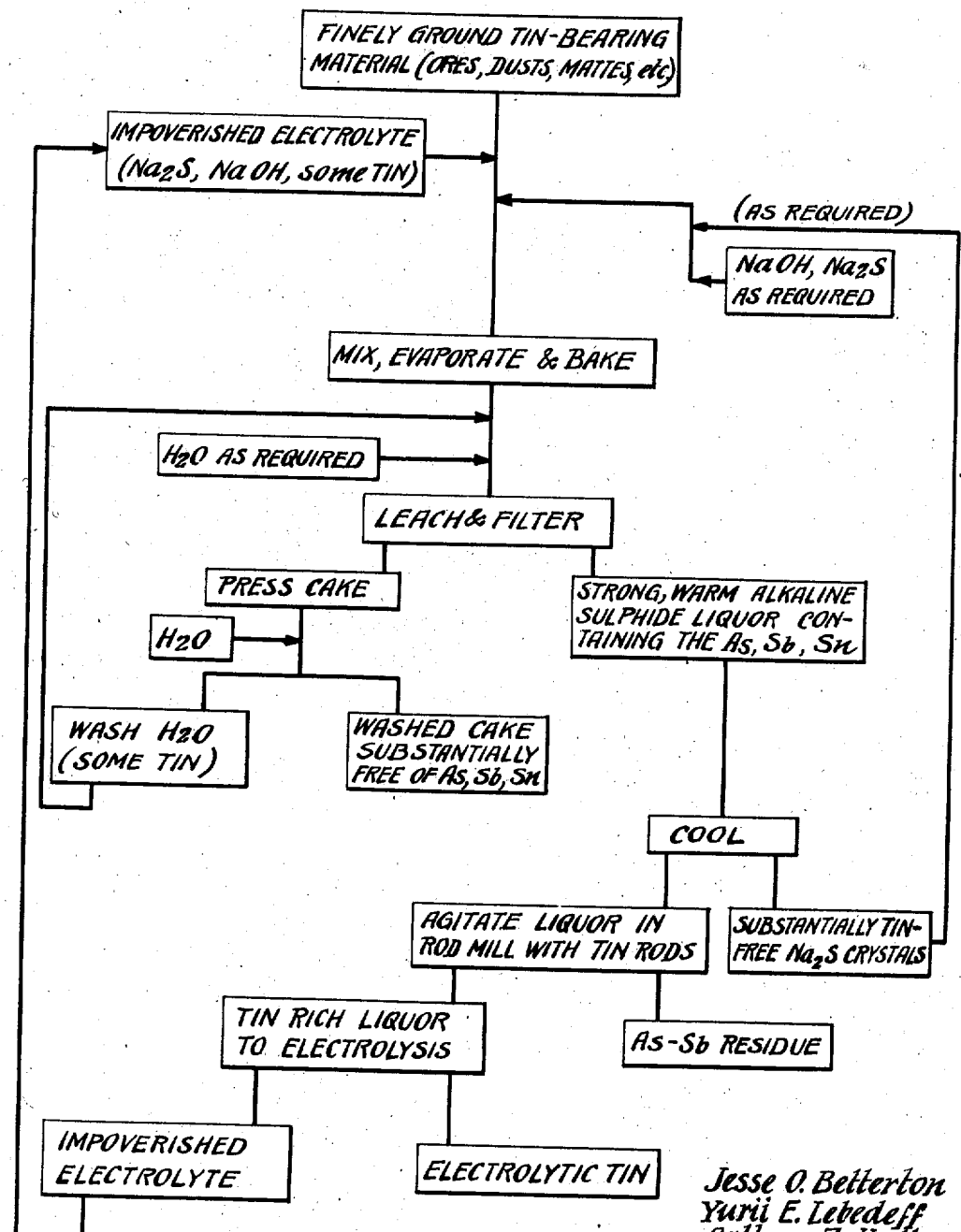

2,329,816

UNITED STATES PATENT OFFICE 2,329,816

PROCESS OF RECOVERING TIN

Jesse O. Betterton and Yurii E. Lebedeff, Metuchen, and Arthur E. Hall, Perth Amboy, N. J., assignors to American Smelting and Refining Company, New York, N. Y., a corporation of New Jersey Application December 16, 1939, Serial No. 309,558

3 Claims. (Cl. 204—121)

The present invention deals with an improved process for recovering tin and certain associated metals from various tin-bearing materials, such as ores, concentrates, flue dust, or the metallurgical by-product known as "white matte."

The efficient recovery of tin from such materials has been a difficult matter owing to the difficulty of separating the tin in an economic manner from associated impurities and recovering the said tin in a substantially pure condition.

The previous processes have required, usually, a large number of manipulations, with substantial amounts of impurities contained in the final tin, which fact has necessitated further refining thereof. In particular, the separation and recovery of pure tin from materials which contain lead, copper, nickel, arsenic, and antimony have been the subject of much investigation and there is considerable prior art on the subject, but in no case is there provided a really direct procedure for effecting an efficient separation of the tin from such accompanying components of the starting material.

One object of the present invention is to provide such a direct process, whereby a substantial quantitative elimination of associated contaminants from the tin is effected, and wherein the tin is recovered efficiently in a high state of purity in an easy and economical manner.

A further object of the invention is to provide a process whereby tin may be easily and directly separated from such associated materials as lead, copper, zinc, iron, and the precious metals.

A further object of the invention is to provide such a process for the separation of tin from the above-indicated, and other, associated materials, and wherein a separation of the tin from substantially all accompanying antimony and arsenic is effected in an easy manner, the separation leaving the tin in a readily recoverable form in substantially pure condition.

Further objects of the invention will become apparent as the description proceeds, and the features of novelty will be pointed out in particularity in the appended claims.

In general, the present improved process depends upon the discovery that, generally speaking, any tin-bearing material in finely divided form, such as flotation concentrates, flue dusts, ores, white matte and the like may be treated at relatively low temperatures with a suitable proportion of a caustic alkali (caustic soda) and an alkali sulphide (sodium sulphide), and when the resulting material is leached with water, substantially all of the tin, antimony, and arsenic present in the original material have passed into the water solution, and that there has been effected in fact a quantitative separation of tin, antimony and arsenic from the remaining constituents of the original material.

It is found in practice that the material must be finely divided in order to obtain an economical and efficient extraction of the tin, antimony and arsenic therefrom. Thus, it is found to be desirable in practice to grind the starting material, if necessary, as is the case when operating upon a metallic material such as white matte, or an ore, to grind the said material to a fineness below 200 mesh. This finely comminuted material then is intermingled with a solution of sodium sulphide and caustic soda in suitable amounts as determined by the composition of the original material. The resulting mixture then is baked at a suitable temperature, for instance, about 900° F. for a suitable length of time, which usually is not long, and the product is leached with water, when it is found that the tin, arsenic and antimony have been rendered substantially water-soluble in the presence of excess caustic and sulphide, and that they may be separated as a filtrate from the insoluble materials remaining after the baking operation.

The press cake is washed several times in water, the washings being united with the first filtrate, until the press cake is substantially free from tin, arsenic and antimony, or, preferably the wash-waters are returned to the leaching stage.

The resulting solution then is passed over a suitable metal which is electropositive to antimony and arsenic, whereby substantially all of the antimony and the major portion of the arsenic precipitates from the solution, leaving a solution which is high in tin, free from antimony and contains only minor amounts of arsenic.

This solution is treated for tin recovery by any suitable procedure, either by electrolysis, or by treatment with lime, for example, which precipitates tin in a form which may be smelted to metal. In either case the caustic alkali and alkali sulphide are regenerated and returned to the baking step with the addition of such further quantities of fresh reagents as the procedure may indicate.

In practice, it is preferred to recover the tin by electrolyzing the tin-containing solution, using insoluble anodes, such as cast iron, carbon, stainless steel or any other anodes that are insoluble in the electrolyte; and the baking may be carried out at temperatures ranging from about 800° F. to about 1000° F.

The invention will be understood in greater particularity by reference to the accompanying drawing, which shows a diagrammatical flow sheet illustrating the preferred procedure in practicing the improved process of this invention.

In line with the illustrated procedure, and the general process as has been set forth above, it will be seen that finely comminuted tin-bearing materials, which may be ores, flotation concentrates, dusts, mattes, or, in fact, any tin-bearing material which may be at hand, the said material being comminuted to less than 200 mesh, is mixed with a solution containing, preferably, for economic reasons, caustic soda and sodium sulphide. The solution mixed with the starting material conveniently may be impoverished electrolyte from the electrolytic tin recovery, or it may be the material regenerated from the lime precipitation of the tin from the final solution; or when the process is being started, the solution is made up of suitable amounts of fresh caustic soda and fresh sodium sulphide.

Where the alkali solution is impoverished electrolyte containing sodium sulphide, caustic soda and residual tin, or where it is regenerated solution from chemical precipitation of the tin, additional caustic soda and/or sodium sulphide are added as required.

The resulting mixture is stirred thoroughly and heated or baked at reactive temperature, for example, from 800° F. to 1000° F., which treatment of course drives off the water present and quantitatively converts the arsenic, antimony and tin apparently into water-soluble thio-compounds.

The resulting material is leached with water, and filtered, the treatment with water being carried out until the baked product is disintegrated completely. The resulting material is filtered and the press cake is washed with fresh water until all the soluble tin is removed.

The wash-water may be returned for leaching fresh quantities of the press cake, and the alkali sulphide liquor filtrate which contains substantially all of the arsenic, antimony and tin contents of the initial material is cooled, during which cooling some sodium sulphide crystals may form which can be returned to the process prior to the baking stage. These sodium sulphide crystals are found in practice to be substantially tin-free.

The liquor freed from crystallizable sodium sulphide is treated to separate antimony and arsenic therefrom. This is done in practice by agitating the liquor in a rod mill in the presence of tin rods, although other metals electropositive to antimony and arsenic, such as lead or copper, may be employed. Tin rods are preferred, however, because obviously the tin introduces no extraneous impurities into the solution. This treatment separates all of the antimony and substantially all of the arsenic from the liquor, the precipitated antimony and arsenic being sent to the antimony plant from recovering the antimony content therefrom.

The high-tin liquor, now substantially free from antimony and containing only minor quantities of arsenic, now is ready for tin recovery, and it may be electrolyzed as described above, or the tin may be precipitated chemically, and the tin precipitate smelted to metal. Electrolysis is preferred in practice, owing to its directness in producing substantially pure tin, but in either event the regenerated solution, impoverished in tin is returned to the baking stage for baking with further quantities of the starting material.

The insoluble press cake from the leaching stage is treated suitably for the recovery of its metal contents, in accordance with well-known standard procedures.

The procedure of the present invention is illustrated by the following specific examples:

*Example 1*

The sulphide flotation concentrates assaying Sn 9.0%, Cu 12%, Pb 7.0%, Zn 4.0%, Fe 20.0%, S 30.0%, Sb 3.0%, Ag 445 oz./ton, were treated by this process.

In accordance with the procedure, six pounds of the flotation concentrates were mixed with 1.2 pounds caustic soda, 2.4 pounds sodium sulphide on a dry basis, 3000 cc. of water. This mixture, which was in the form of slimes, was evaporated to dryness in a cast iron kettle, and baked for 15 minutes at 900° F. It will be observed in this example that the ratio of reagents to concentrate is: concentrate 1.0, caustic soda 0.2, sodium sulphide 0.4.

The baked material was treated with 4000 cc. of water, the mixture being heated until the baked mass was disintegrated thoroughly. The resulting material was filtered, there being obtained 3000 cc. of strong alkali solution containing tin 50.3 grams per liter, antimony, 13.8 grams per liter, arsenic 4.0 grams per liter.

The wet filter cake was washed with 3000 cc. of hot water, the first wash-water containing tin 15.8 grams per liter, antimony 5.5 grams per liter, arsenic 2.2 grams per liter. A second portion of 3000 cc. of hot water was used to wash the filter cake the second time, the second wash-water containing tin 8.1 grams per liter, antimony 2.2 grams per liter, arsenic 1.6 grams per liter. A third washing of the press cake with 3000 cc. of water resulted in the third wash-water containing tin 3.8 grams per liter, antimony 1.1 grams per liter, arsenic 0.7 gram per liter.

These wash-water portions were returned to the system for leaching further quantities of the baked product.

The dry filter cake, which weighed 4.8 pounds, was found to contain only 0.5% Sn, 0.65% Sb, 0.07% As. It contained also Pb 8.7%, Cu 15.0%, Zn 5.0%, Fe 25.0%, Ag 619 oz./ton. This press cake is treated in any suitable standard way for the recovery of its values.

The strong alkali solution which is high in tin is then passed over tin rods contained in a rod mill, the said rods measuring approximately ⅜" in diameter and 4" in length in this particular test, but obviously the size of these rods is not fixed, nor is it in fact necessary to use tin, as lead might also be used, but tin is preferable because it introduces no extraneous metal into the solution. The resulting solution assayed about 54.5 grams Sn per liter, As 2.4 grams per liter, while the antimony was reduced to only 0.20 gram per liter. It may be noted that the advantage of rods over other forms of metallic tin, such as balls, granulated tin, or the like, resides in the ease with which the antimony precipitate can be washed off the rods, and also, by reason of the shape of the rods by rolling over each other in the mill, the entire surface of the tin is kept clean and accurate.

The resulting purified solution was electrolyzed with insoluble anodes at current density of from 10 to 15 amperes per square foot, with the electrolyte maintained at approximately 80° C. This electrolysis preferably is carried out in a diaphragm cell, although the use of the diaphragm is not essential in every case.

It is found that the electrolysis may be carried on to the point where 93% of the tin contained therein is deposited. The electrolyte, thus depleted in tin but high in caustic alkali and alkali sulphide, and containing some arsenic, is returned to the system for baking with further quantities of starting material.

When this solution has been recycled until the arsenic builds up to an objectionable extent therein, the solution is withdrawn and the tin content thereof is recovered by precipitation of lime and the resulting precipitate is fumed to separate the arsenic, and then smelted to metallic tin. The total tin recovered by the process is found in practice to amount to 95% or better.

By reason of the insolubility of the sulphide of Co, Pb, Cu, Ni, Fe, Zn, Au and Ag in alkaline solutions, these elements are absent in all of the sulphide solutions resulting from this baking procedure.

Example 2

A tin-containing "white matte" was leached with sulphuric acid and nitric acid, and the residue from the leaching, which contained Pb 20%, Sn 33%, and which is essentially a mixture of meta-stannic acid and lead sulphate, was baked with sodium sulphide and caustic soda, one part by weight of the residue being baked with one part of caustic soda, one part of sodium sulphide and ten parts by weight of water, for one half hour at 700° F. There was obtained a total extraction of water-soluble tin amounting to 96% of the tin content of the residue.

Example 3

A tin-containing material assaying Pb 20%, Sn 31.8%, Cu 0.6%, Zn 3.2%, Ni 1.2%, $SiO_2$ 10.26%, S 2.95%, Fe 5.6%, Sb 0.88%, As 0.25%, Ag 19% and Au 0.4%, in which tin was present as tin oxide, was treated as above, one part by weight of press cake being baked for one half hour at 700° F. with one part by weight of caustic soda, one part sodium sulphide and five parts by weight of water, resulting in 98% of the total tin being rendered water-soluble, to the substantially complete exclusion of the remaining associated materials except arsenic and antimony.

Example 4

Tin-bearing oxide fume containing Sn 35%, As 10.9%, Sb 8.6%, Pb 16.0%, S 0.7%, Zn 1.2%, was baked for 15 minutes at 900° F. and the ratio of one part by weight of fume, 0.2 part by weight of caustic soda, 0.8 part by weight of sodium sulphide, and three parts by weight of water, produced a water-soluble conversion of 92% of the tin content.

Example 5

A "white matte" containing Sn 20.3%, Cu 45.2%, Ni 1.6%, Pb 13.2%, Sb 1.8%, As 0.26%, Fe 1.2%, S 2.26%, as intermetallic compounds, was ground to less than 200 mesh, and baked in ratio of one part by weight of white matte, 0.4 part by weight of caustic soda, one part by weight of sodium sulphide and four parts by weight of water, the baking being for 15 minutes at 900° F., resulting in an aqueous extraction of 94% of the total tin content.

Example 6

Complex tin-bearing sulphide ore was baked as described above in the ratio of one part by weight of ore, 0.2 part by weight of caustic soda, 0.4 part by weight of sodium sulphide and four parts by weight of water and there resulted an extraction of 92% of its tin content.

It will be seen from the foregoing description that the process provides an efficient procedure for extraction of tin in a direct and effective manner from virtually all types of tin-bearing materials, the tin being extracted in soluble form along with important amounts only of arsenic and antimony, the major part of the former and substantially all of the antimony being readily separated from the solution, which is then ready for tin recovery, with regeneration of reagent for action on further quantity of raw material, a high grade tin being produced in the final recovery of the tin value, which recovery leaves only unimportant amounts of tin in the leached residue from the baking operation.

It will be understood that the invention is not limited, necessarily, to the specific details of the procedure as are herein specifically described, and it will be apparent that the process is intended to include any materials that are the apparent equivalents of those herein specifically disclosed; and it will be apparent that the described details of operation are subject to various modifications which will become apparent readily to one skilled in the art, without departing from the spirit of the invention. It is also to be understood that the following claims are intended to cover all of the generic and specific features of the invention herein described, and all statements of the scope of the invention which, as a matter of language, might be said to fall therebetween.

What is claimed is:

1. The process of separating tin from complex tin-bearing materials, which comprises mixing said materials in finely divided form with an aqueous solution of caustic alkali and alkali metal sulphide so as to produce a slurry in which the ratio by weight of the reagents and materials treated is as follows: tin-bearing materials 1.0, caustic alkali 0.2 and alkali metal sulphide 0.4, heating said slurry mixture to evaporate it to dryness producing a dry mass, making said mass at approximately 900° F. for about ¼ of an hour to convert substantially all the tin into water soluble compounds, and thereafter extracting the said water soluble tin compounds from said baked mass by leaching the same with water.

2. The process of recovering tin from tin-bearing materials, which comprises intimately mixing finely divided particles of said tin-bearing materials with an aqueous solution of caustic soda and sodium sulphide to form a slurry in which the ratio by weight of the reagents and materials treated is approximately as follows: tin-bearing materials 1.0, caustic sola 0.2 to 1.0, sodium sulphide 0.4 to 1.0, baking said slurry at a temperature between 700 and 900° F. for ¼ to ½ hour until a dry baked mass is produced in which substantially all of the tin content has been converted into water soluble compounds, disintegrating the baked mass with water to extract said water soluble tin compounds, and recovering the tin from the water solution by electrolysis.

3. The process of extracting tin from complex tin-bearing materials, which comprises mixing the said materials in finely divided form with an aqueous solution containing caustic soda and sodium sulphide to form a slurry mass, said caustic soda and sodium sulphide being present in amounts slightly in excess of that calculated as required for reacting with the tin present in said tin-bearing materials and approximating in parts by weight with the materials treated as follows: tin-bearing materials 1.0, caustic soda 0.2 to 1.0, sodium sulphide 0.4 to 1.0, heating said slurry mass to a temperature between 700° and 900° F. for ¼ to ½ hour to produce a substantially dry baked mass in which the major part of the tin has been converted into water soluble compounds, subjecting said baked mass to water to leach out said water soluble tin compounds.

JESSE O. BETTERTON.
YURII E. LEBEDEFF.
ARTHUR E. HALL.

CERTIFICATE OF CORRECTION.

Patent No. 2,329,816. September 21, 1943.

JESSE O. BETTERTON, ET AL.

It is hereby certified that error appears in the printed specification of the above numbered patent requiring correction as follows: Page 3, second column, line 48, claim 1, for "making" read --baking--; line 62, claim 2, for "sola" read --soda--; and that the said Letters Patent should be read with this correction therein that the same may conform to the record of the case in the Patent Office.

Signed and sealed this 23rd day of November, A. D. 1943.

Henry Van Arsdale,
Acting Commissioner of Patents.

(Seal)

and sodium sulphide to form a slurry mass, said caustic soda and sodium sulphide being present in amounts slightly in excess of that calculated as required for reacting with the tin present in said tin-bearing materials and approximating in parts by weight with the materials treated as follows: tin-bearing materials 1.0, caustic soda 0.2 to 1.0, sodium sulphide 0.4 to 1.0, heating said slurry mass to a temperature between 700° and 900° F. for ¼ to ½ hour to produce a substantially dry baked mass in which the major part of the tin has been converted into water soluble compounds, subjecting said baked mass to water to leach out said water soluble tin compounds.

JESSE O. BETTERTON.
YURII E. LEBEDEFF.
ARTHUR E. HALL.

CERTIFICATE OF CORRECTION.

Patent No. 2,329,816. September 21, 1943.

JESSE O. BETTERTON, ET AL.

It is hereby certified that error appears in the printed specification of the above numbered patent requiring correction as follows: Page 3, second column, line 48, claim 1, for "making" read --baking--; line 62, claim 2, for "sola" read --soda--; and that the said Letters Patent should be read with this correction therein that the same may conform to the record of the case in the Patent Office.

Signed and sealed this 23rd day of November, A. D. 1943.

Henry Van Arsdale,
Acting Commissioner of Patents.

(Seal)